United States Patent
Schill et al.

(10) Patent No.: US 6,512,516 B1
(45) Date of Patent: Jan. 28, 2003

(54) VOXEL-BASED SYSTEM TO PERMIT RAPIDLY DEFORMING VOLUMETRIC OBJECTS MADE UP OF INHOMOGENEOUS MATERIAL

(75) Inventors: Markus Andrew Schill, Heidelberg (DE); Sarah F. Gibson, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 09/166,409

(22) Filed: Oct. 5, 1998

(51) Int. Cl.[7] .................................. G06T 17/00
(52) U.S. Cl. ..................... 345/424; 345/473; 345/440; 345/441; 382/128
(58) Field of Search ................. 345/424, 473, 345/474, 475, 440, 441; 382/128

(56) References Cited

PUBLICATIONS

Jegathese et al. "A New Approach for Goal–Oriented Deformation of Voxel Models", (IEEE, this Conference was held Jun. 26–29, 1998, pp. 214–215).*

Chen et al. "Physically–based Animation of Volumetric Objects", (IEEE, this Conference was held Jun. 8–10, 1998, pp. 154–160).*

Klein "Forward Deformation of PET Volumes Using Material Constraints", (IEEE, this Conference was held Jun. 26–27, 1998, pp. 64–71).*

Schill et al. "Biomechanical Simulation of the Vitreous Humor in the Eye an Enhanced ChainMail Algorithm", Oct. 1998, Internat. Conference on Medical Image Computing and Computer–Assisted Intervention, 9 pages.*

* cited by examiner

Primary Examiner—Mark Zimmerman
Assistant Examiner—Kimbinh T. Nguyen
(74) Attorney, Agent, or Firm—Dirk Bringman

(57) ABSTRACT

An improvement to a voxel-based system to permit rapidly deforming volumetric objects made up of inhomogeneous material provides different material constraints assigned to different elements, with the constraints of a link between two neighboring elements being calculated from contributions of the two affected elements. The order in which neighbors of moved element are considered for a move determines where in the body information is propagated first. The processing order can therefore be used to model different direction-dependent propagation speeds in the material.

14 Claims, 5 Drawing Sheets

VOXEL-BASED SYSTEM TO PERMIT RAPIDLY DEFORMING VOLUMETRIC OBJECTS MADE UP OF INHOMOGENEOUS MATERIAL

FIELD OF INVENTION

This invention relates to voxel-based systems and more particularly to a system for rapidly deforming volumetric inhomogenous objects.

BACKGROUND OF THE INVENTION

Surgical simulation requires interactive modeling and visualization of complex, 3D anatomical structures. For example, surgery of the abdomen involves probing and cutting through organs and tissues that have complex shapes and material properties. Because modeling the deformation and cutting of tissue requires a representation of interior structure. Volumetric object representation is well suited to surgical simulation. A volumetric representation can incorporate detailed information about internal anatomical or physiological structure. This detailed information can be used to model tissue deformation more accurately than a model which represents the object surface and assumes a homogeneous interior.

In the past, a so-called 3D ChainMail algorithm has been developed for rapid deformation of homogenous objects as described by S. Gibson "3D ChainMail: A fast algorithm for Deforming Volumetric Objects" Proceeding 1997 Synopsis on Interactive 3D Graphics pp. 149–154, Providence R.I. USA, 1997. In this algorithm, links between sampled data elements are established and characteristics of these links are defined. The links are such that an element is moved only if it needs to be which eliminates calculating movement of elements not affected by the movement of the selected element. The 3D ChainMail algorithm in one embodiment performs simple deformation calculations for each element of the graphical object to be deformed such that when the object is manipulated, the object stretches or contracts through the movement of neighboring elements only if a maximum or minimum preset distance is exceeded between the moved element and its neighbor.

While link characteristics are relatively easy to establish for homogenous materials, the problem is more complex for inhomogenous materials. Modeling of inhomogenous materials is important in applications ranging from image processing to virtual reality. In surgical simulation, for example, 3D ChainMail can be used for tissue modeling. Since tissue, in general, is not homogenous, techniques must be developed to take into account the speeds of propagation in inhomogenous materials.

SUMMARY OF THE INVENTION

In the subject invention, the 3D ChainMail algorithm is enhanced based on a physical model of how information is propagated through a body by passing it from one element to another. To achieve correct propagation of information in inhomogenous material, two basic concepts are introduced.

First, in ChainMail the material constraints determine the "stiffness" of a connection between two neighbors. To model inhomogenous material, different material constraints are assigned to different elements.

Secondly, the order in which neighbors of moved elements are considered for a move determines where in the body information is propagated first. The processing order can therefore be used to model different, direction-dependent propagation speeds in the material.

After moving an element, its neighbors are examined to determine whether any constraint has been violated. The constraints between two neighbors are the sum of the contributions from the two affected elements. Note, affected elements are those which are neighbors of a moved element. If a constraint was violated, the neighbor with the largest constraint violation is processed first. This is equivalent to processing neighbors in the order in which their constraints were violated. By always following this order, it is guaranteed that the information follows the "stiffest" links.

In summary, an improvement to a voxel-based system to permit rapidly deforming volumetric objects made up of inhomogeneous material includes providing different material constraints assigned to different elements, with the constraints of a link between two neighboring elements being calculated from contributions of the two affected elements. The order in which neighbors of moved element are considered for a move determines where in the body information is propagated first. The processing order can therefore be used to model different direction-dependent propagation speeds in the material.

BRIEF DESCRIPTION OF THE DRAWINGS

These and other features of the subject invention will be better understood taken in conjunction with the Detailed Description in conjunction with the Figures of which.

DETAILED DESCRIPTION

By way of example, consider the modeling of the vitreous humor of the eye. The vitreous humor is a semi-transparent, high-deformable gel that normally fills the eyeball. During the surgery, this gel is removed from the eyeball with a vitrector, which sucks the gel into the instrument, cuts off the extruded gel with an internal, oscillating knife, and pumps the extracted material out of the handle of the instrument. Care must be taken to remove as much material as possible while avoiding delicate structures at the back of the eye that can be damaged by minimal contact with the instrument.

Figure 1:
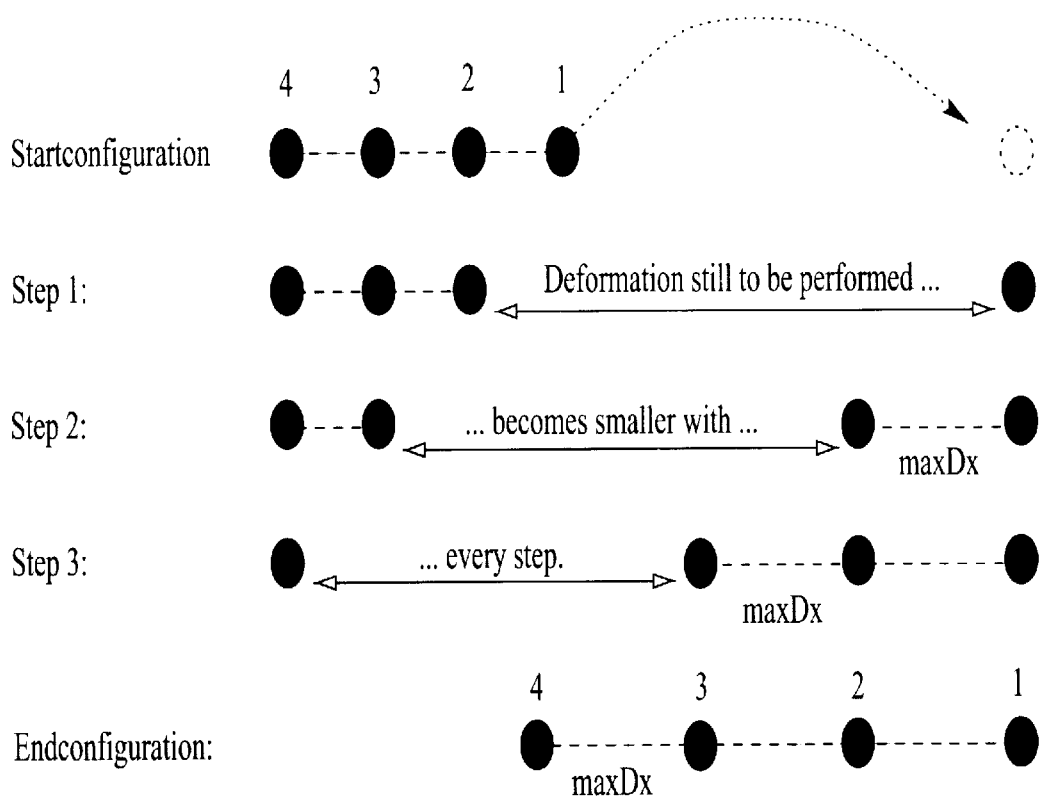
FIG. 1 is a diagrammatic representation of the deformation process in one direction.

Because of the highly deformable nature of the vitreous humor and the mechanical complexity of the extraction process, the surgical procedure is not well modeled with conventional deformation techniques such as mass-spring systems or Finite Element Methods. While particle systems provide a possible solution, the lack of direct inter-particle communication can also make these systems too slow for an interactive simulation when a relatively large number of particles are used. In contrast, the 3D ChainMail algorithm, introduced by Gibson in 1997 and described in FIG. 1, provides fast interactions with highly deformable materials containing 10's of thousands of elements. This capability provides the potential for addressing the highly demanding requirements of modeling many different kinds of objects. However, the original 3D ChainMail does not address inhomogeneous materials.

FIG. 1 illustrates the ChainMail process in one dimension. The ChainMail algorithm enables fast propagation of the deformation information because connections to neighboring elements are explicitly stored in the object data structure. The algorithm described above uses 4-connected neighborhoods in 2D and 6-connected neighborhoods in 3D. The relative positions between neighboring elements are governed by a set of deformation and shear constraints.

Note that in FIG. 1 the deformation is initiated by moving element #1. In the next step, element #2 implicitly changes the information that is passed on to element #3 by adjusting its position according to the material constraint, maxDx, where maxDx is the maximum allowed distance between two elements. When the original elements are separated by a distance less than maxDx, the amount of deformation that remains to be performed decreases with every step.

3D ChainMail is the first step in an iterative process that models shape changes in deformable objects. Its function is to approximate the new shape of a deformed object by minimally adjusting element positions to satisfy geometric constraints between the elements in the volumetric object. The second step in the deformation process, Elastic Relaxation, relaxes the approximate shape of a deformed object to reduce an elastic energy measure in the object.

3D ChainMail is physically-based in the sense that the information of a deformation process is propagated through the object by passing it from one volume element to another. As information travels through the object, each element reacts by adjusting its own position within certain material constraints. By adjusting its position, an element changes the information, or the amount of deformation still to be performed, that is propagated to neighboring elements. Once this deformation information is reduced to zero or there are no more neighbors to propagate the information to, the process ends.

Figure 2:
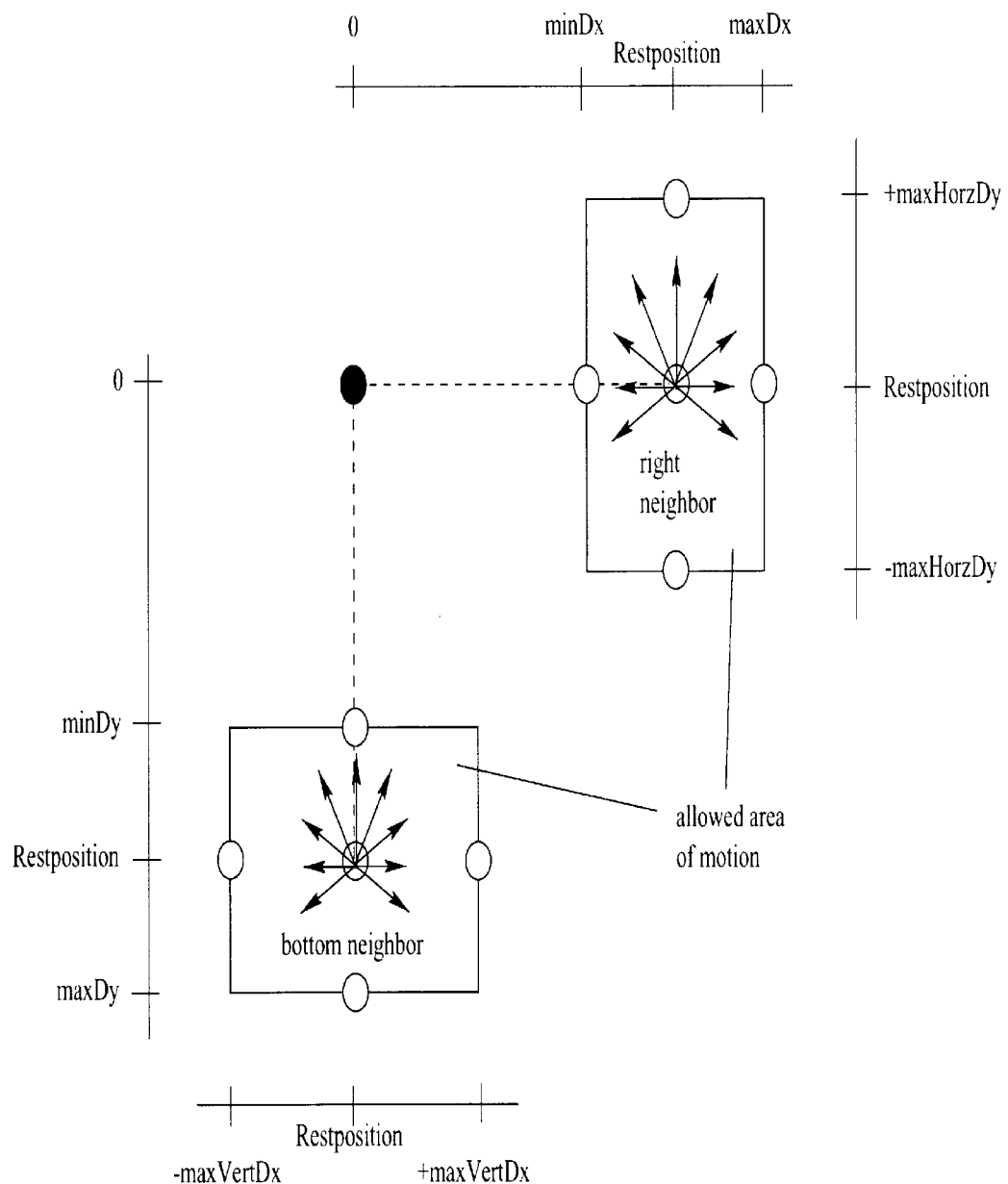
FIG. 2 is a diagrammatic representation of six constraints that determine the material properties in 2D.

FIG. 2 shows the six constraints that determine the material properties in 2D. Here, the geometric constraints between an element (black) and its right and bottom neighbors are illustrated. In 2D, six material constraints are used to model different material properties with ChainMail: maxDx; minDx, maxDy, and minDy govern the compression or stretch of the material, while maxVerDx and maxHorzDy govern the possible shear between neighbors.

Different constraints controlling vertical, horizontal, and front-to-back deformation and shear allow anisotropic material properties. However, the algorithm is particularly fast because it assumes that these constraints are constant throughout the volumetric object. Because the vitreous humor is not homogeneous, especially in pathological cases, it is important that the above algorithm be expanded to address inhomogeneous tissues.

For inhomogeneous materials, the first-moved-first-processed element processing order that was used in 3D ChainMail is no longer appropriate.

The ChainMail algorithm for inhomogeneous materials can be refined by thinking about deformation as a physical process in which deformation information travels through the material as a sound wave. In general, the speed of sound is higher in denser material because the "connection" between elements is stiffer. In ChainMail the "stiffness" of a connection between two neighbors is determined by the material constraints of the two elements. In inhomogeneous materials, when neighboring elements have different material constraints, the constraints for the link between the two neighbors are calculated using contributions from both elements.

Figure 3:
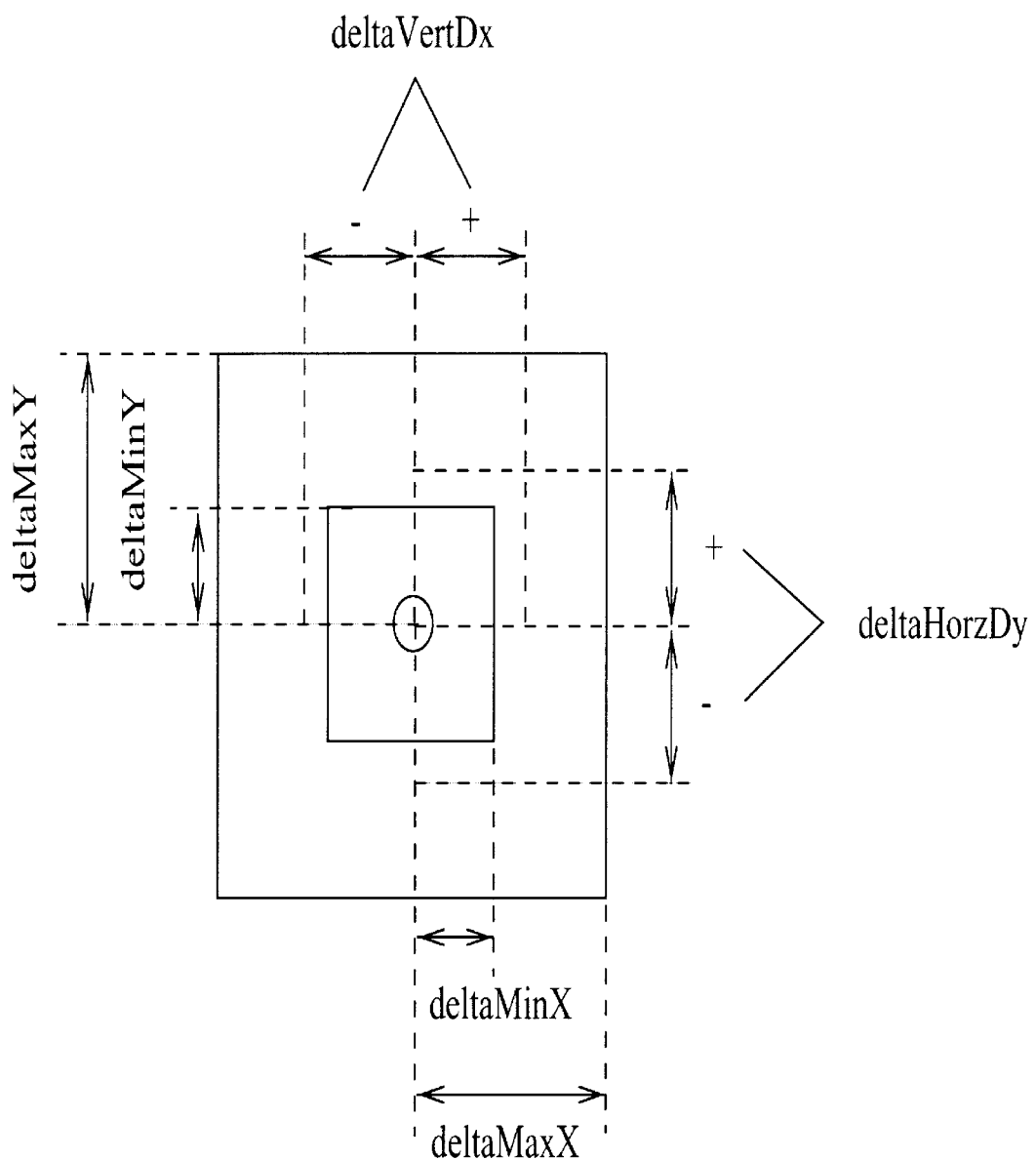
FIG. 3 is a diagrammatic representation of the constraints assigned to a single element in the subject enhanced system.

FIG. 3 shows the constraints that are assigned to a single element in the subject enhanced ChainMail algorithm. Here, the indicated constraints are assigned to a single element in the Enhanced ChainMail Algorithm. deltaMaxX, deltaMaxY and deltaMinY, correspond to maximum allowed stretch and compression in the horizontal and vertical directions respectively.

+/−deltaVertX and +/−deltaHorzY correspond to the maximum allowed shear to vertical and horizontal neighbors respectively.

Figures 4A, 4B, 4C:
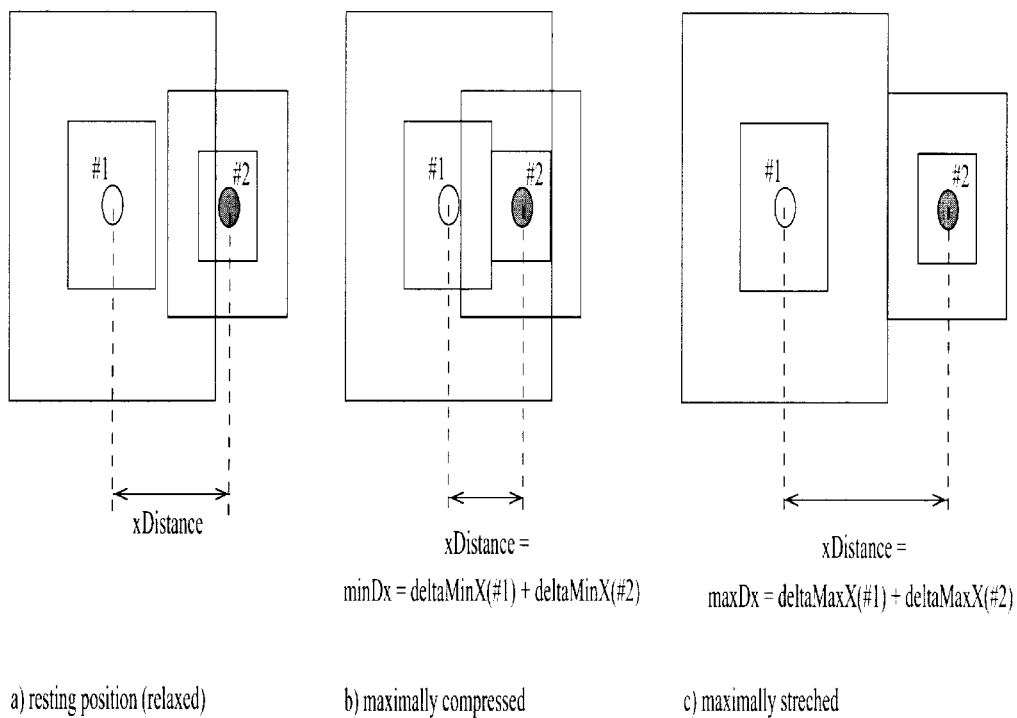
FIGS. 4A–C are diagrammatic representations of the contributions of both neighbors which continue to give the constraints that govern the links between them for a resting position, maximally compressed and maximally stretched conditions; and, FIGS. 5A–D are illustrations of the deformation of a gray-scale picture utilizing the subject system.

FIGS. 4A–C illustrate how the two neighbors contribute to the constraints that determine their relative behavior. As can be seen, these figures illustrate that the contributions of both neighbors combine to give the constraints that govern the link between them.

The order in which neighbors of a moved element are processed determines where the deformation information is propagated first. Hence, the processing order can be used to model material and direction-dependent propagation speeds in the object. The subject Enhanced ChainMail Algorithm uses this observation to order the processing of elements in the object so that the deformation travels most quickly through stiff materials. The ordering is determined by comparing the constraint violations between neighboring elements and processing elements with the largest constraint violations first. For example, the constraint violations for element #2 in step 1 of FIG. 1 is determined as follows:

$$\text{amount of constraint violation} = \text{distance}_{\#1,\#2} - \text{max}Dx$$

After moving an element, its neighbors are examined to determine whether any constraint has been violated. If so, the neighbor with the largest constraint violation is processed first. This is equivalent to processing neighbors in the order in which their constraints were violated, guaranteeing that the deformation information is propagated fastest through stiff materials.

In one embodiment, a 2D version of the Enhanced ChainMail Algorithm maintains four lists which hold the elements that must be considered for a move, e.g., movement candidates. There is one list each for right (RCL), left (LCL), top (TCL) and bottom neighbors (BCL). The lists indicate which element each list entry must be checked against, e.g., an element that is stored in the top list must be checked against its bottom neighbor. The process starts when an initial sponsoring element in the object is moved to a new position. After this, neighboring elements are added to the appropriate movement candidate lists and the lists are ordered so that elements with the largest constraint violations are considered first. The deformation is propagated to other elements in the object as more neighbors are considered for movement. Table 1 outlines the enhanced ChainMail Algorithm in pseudo code.

TABLE 1

Pseudo code description for the Enhanced ChainMail Algorithm.

```
initialSponsor.position = newPosition;              thisElement.updatePosition;
addRightNeighborToRCL ;                             addLeftNeighborToLCL ;
addTopNeighborToTCL ;                               addTopNeighborToTCL ;
addBottomNeighborToBCL ;                            addBottomNeighborToBCL ;
addLeftNeighborToLCL ;                         else if(largestViolation in TCL)
while (elements in lists)                               popElementFromList ;
    // find element with largest                        if(checkVsBottom demands move)
    // constraint violation from lists                      thisElement.updatePosition;
    if(largestViolation in RCL)                             addTopNeighborToTCL ;
        popElementFromList ;                                addLeftNeighborToLCL ;
        if(checkVsLeft demands move)                        addToRightNeighborToRCL ;
            thisElement.updatePosition ;           else if(largestViolation in BCL)
            addRightNeighborToRCL ;                     popElementFromList ;
            addTopNeighborToTCL ;                       if(checkVsTop demands move)
            addBottomNeighborToBCL ;                        thisElement.updatePosition;
    else if(largestViolation in LCL)                        addBottomNeighborToBCL ;
        popElementFromList ;                                addLeftNeighborToLCL ;
        if(checkVsRight demands move)                       addToRightNeighborToRCL ;
```

The movement candidate lists can be sorted easily if new elements are inserted into the correct position when they are added to the list. In one embodiment, the lists are implemented as binary trees, making it relatively fast and easy to insert and find elements.

Figure 5A:
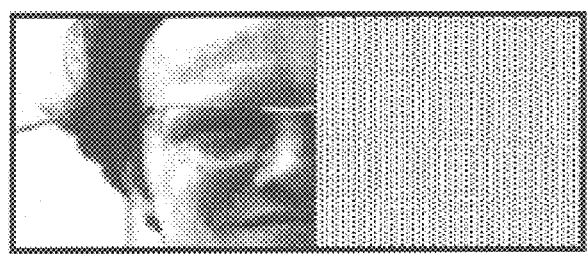
Figure 5B:
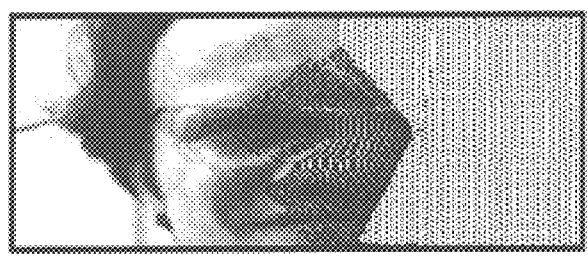
Figure 5C:
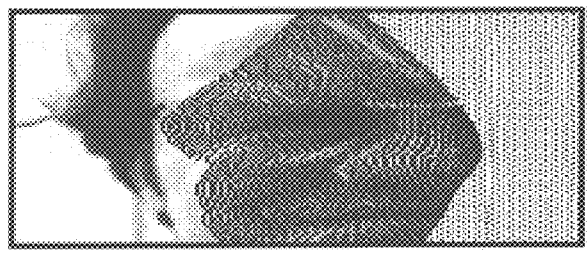
Figure 5D:
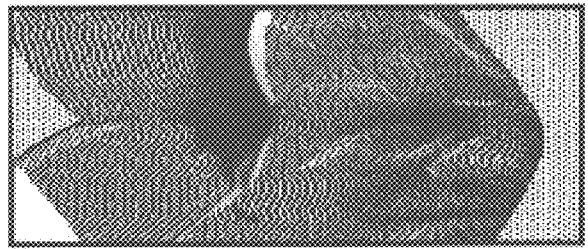

The Enhanced ChainMail Algorithm was implemented and tested in 2D for a number of test objects and integrated into a general system which enables a 2D gray-scale image to be read into the system, material constraints to be set using a lookup table on gray-scale values, and the resultant 2D model to be interactively manipulated. The sequence in FIGS. 5A–D shows the deformation of a gray-scale picture using this system. Here, the gray values of the original picture illustrated in FIG. 5A are interpreted as material constraints. White is soft material and black is rigid material. As a result, the gray values in the original picture, shown at FIG. 5A, were mapped to material constraints that were a linear function of the gray scale value, where black pixels became rigid elements and white pixels became highly deformable elements. The sequence shows the deformation of the image when an element on the right side of the image is grabbed and moved to the right. Notice how the more rigid hair on the left border of the picture affects the softer surrounding material during the deformation.

In summary, the Enhanced ChainMail algorithm addresses the need for modeling complex, inhomogeneous materials at interactive rates in simulations such as modeling the vitreous humor. The algorithm is also well suited for other tissue modeling applications.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one ordinary skill in the art and are contemplated as falling within the scope of the invention as limited only by the appended claims and equivalents thereto.

What is claimed is:

1. In a method of rapidly deforming volumetric objects, each having volume elements joined by links, a method for deforming inhomogeneous materials comprising the steps of:
    assigning different material constraints to different volume elements in accordance with a predetermined stiffness factor;
    moving a volume element;
    calculating the constraints of a link between two neighboring elements to the moved element from contributions of the two neighboring elements; and,
    moving neighbors of the moved element in a processing order determined by where in the object information is propagated first and then only when a constraint is violated.

2. The method of claim 1, wherein where in the object information is propagated first is determined by the neighbor having the largest constraint violation, such that the move of the neighbor having the largest constraint violation is processed first whereby the information follows the stiffest links.

3. The method of claim 1, wherein said processing order determines different propagation speeds in the inhomogeneous material.

4. The method of claim 1, wherein the constraints between two neighboring volume elements are the sum of the contributions from said neighboring elements.

5. A method for deforming a non-homogeneous object, comprising:
    determining a stiffness of a first link between a first element, representing a first type material having an associated first constraint, and a third element, representing a third type material having an associated third constraint, based on the first constraint and the third constraint;
    determining a stiffness of a second link between a second element, representing a second type material having an associated second constraint different than the first constraint, and the third element, based on the second constraint and the third constraint;
    moving the third element;
    moving the first element to a position corresponding to the movement of the third element and the stiffness of the first link; and
    moving the second element to a position corresponding to the movement of the third element and the stiffness of the second link.

6. A method according to claim 5, wherein the first constraint corresponds to a first density, the second constraint corresponds to a second density different than the first density, and the third constraint corresponds to a third density.

7. A method according to claim 5, wherein the third constraint is one of the same as the first constraint, the same as the second constraint, and different than both the first and the second constraints.

8. A method according to claim 5, wherein the stiffness of the first link is less than the stiffness of the second link, and the second element is moved prior to the first element based on the second link stiffness being greater than the first link stiffness.

9. A method according to claim 5, wherein the first constraint is a maximum allowed stretch and compression of the first element, the second constraint is a maximum allowed stretch and compression of the second element, and the third constraint is a maximum allowed stretch and compression of the third element.

10. A method according to claim 5, wherein the first constraint is a maximum allowed shear of the first element, the second constraint is a maximum allowed shear of the second element, and the third constraint is a maximum allowed shear of the third element.

11. A method according to claim 5, wherein:

the first constraint is a maximum allowed movement of the first element, the second constraint is a maximum allowed movement of the second element, and the third constraint is a maximum allowed movement of the third element;

the stiffness of the first link is represented by a first distance based on the maximum allowed movement of the first element and the maximum allowed movement of the third element; and the stiffness of the second link is represented by a second distance based on the maximum allowed movement of the second element and the maximum allowed movement of the third element.

12. A method for deforming a non-homogeneous object, comprising:

moving a third element;

moving a first element, representing a first type material having an associated first constraint and connected to the third element by a link having a first distance associated therewith, to a position corresponding to the movement of the third element;

moving a second element, representing a second type material having an associated second constraint different than the first constraint and connected to the third element by a link having a second distance associated therewith, to a position corresponding to the movement of the third element;

determining a third distance between the moved third element and the first element and a fourth distance between the moved third element and the second element;

determining a first amount of constraint violation based on a difference between the first distance and the third distance; and determining a second amount of constraint violation based on a difference between the second distance and the fourth distance;

wherein the first element is moved prior to the movement of the second element if the first amount of amount of constraint violation exceeds the second amount of constraint violation, and the second element is moved prior to the movement of the first element if the second amount of constraint violation exceeds the first amount of constraint violation.

13. A method according to claim 12, wherein:

the first constraint is a maximum first distance allowed movement of the first element and the second constraint is a maximum second distance allowed movement of the second element;

the first distance is based on the maximum distance allowed movement of the first element; and the second distance is based on the maximum distance allowed movement of the second element.

14. A method according to claim 13, wherein:

the first distance is also based on a maximum distance allowed movement of the third element; and the second distance is also based on the maximum distance allowed movement of the third element.

* * * * *